July 24, 1962    R. S. COPELAND    3,046,173

EMBOSSED PLASTIC SHEETS AND METHOD OF MAKING SAME

Filed Dec. 14, 1960

INVENTOR.
RICHARD S. COPELAND
BY
*Price & Heneveld*

ATTORNEYS

United States Patent Office 3,046,173
Patented July 24, 1962

3,046,173
EMBOSSED PLASTIC SHEETS AND METHOD OF MAKING SAME
Richard S. Copeland, Grand Rapids, Mich., assignor to Sackner Products, Inc., Grand Rapids, Mich., a corporation of Michigan
Filed Dec. 14, 1960, Ser. No. 75,829
5 Claims. (Cl. 154—47)

This invention relates to embossed laminates, and more particularly to a compressible backing for dielectrically embossed plastic sheets and a method of making the same.

Decorative panels formed by embossing a plastic sheet with a pattern have gained fairly widespread adoption today for such items as interior panels in automobiles and the like. In the dielectric embossing process, a pair of electrodes, one usually a flat, stationary press platen and the other a reciprocable die having a projecting pattern, are used to indent a thermoplastic sheet into a compressible backing to soften the sheet and reharden it into a decorative pattern. High frequencies, usually of the radio frequency range, are impressed across the non-conductive plastic to cause what is believed to be a continuous reversal of molecular orientation, thereby locally heating the thermoplastic material along the lines of the electrode die.

As backing for the plastic sheet, several materials of various structures have been used, one of these being a fibrous pad. The common combed or oriented fibrous pad as known today does not possess the optimum amount of compressibility to effectuate the most desirable and permanent embossment pattern, nor does it afford the most luxurient padding. Recently, a fibrous backing layer of randomly positioned fibers to give a lofty uncompacted layer (see U.S. Patent 2,784,132) has been substituted for the combed backing. This material, although providing a useable backing for some purposes, does not allow the formation of a sharply defined embossed indentation pattern line since the layer readily compresses in areas adjacent the pattern delineations when the die presses the thermoplastic sheet into the fibrous layer.

Therefore, it is an object of this invention to provide a backing for indentation embossed plastic sheets, especially dielectrically embossed sheets, that enables the production of a sharply defined and deep pattern line and also affords a luxurious padding for the elegantly embossed plastic sheet.

Further objects of this invention are to provide a backing that is readily and firmly sealed to the plastic sheet to be embossed; that possesses an abundance of tensile strength so that the embossed laminate may be stretched tightly over sharp edges of a panel to be decorated without the backing pulling apart or away from the plastic sheet; and that is relatively inexpensive to manufacture in comparison with competitive products.

A further object of this invention is to provide a novel method of forming a superior backing for plastic sheets to be embossed by combining several fairly simple steps into a resulting unique process.

Still further objects and advantages of the novel backing, the novel embossed laminate, and the novel method will be apparent upon studying the following specification in conjunction with the drawings in which.

Figure 1:
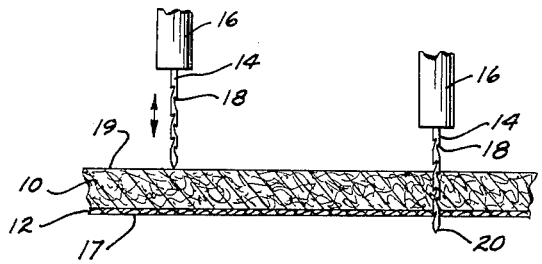
FIG. 1 is a sectional view of the novel backing being needled.

Basically, the invention comprises a backing including a layer of randomly positioned fibers in three dimensions as contrasted to combed or otherwise oriented fibers, at least a substantial share of which are fibers of a thermoplastic material, and said layer being needled to a woven cloth sheet adjacent the fibrous layer. By needling these two layers, a substantial share of the fibers are intertangled with each other and with the woven cloth to partially compact and impart strength to the padding or backing of randomly oriented, loosely assembled fibers. Depending upon the proportion of thermoplastic fibers in the fibrous layer, a thin coating of resin is applied to either or both the exposed surface of the woven cloth and to the surface fibers on the layer of randomly positioned fibers in order to supplement the sealing effect between the embossable plastic sheet and the thermoplastic fibers in the backing, and to contribute to the necessary heat generated by the materials during the dielectric embossment. The sealing is effectuated simultaneously with the dielectric embossing step along the lines of the embossed pattern in a manner to be explained.

The novel backing material includes a layer of randomly positioned, loosely assembled fibers which are purposely caused to be placed at various angles with respect to each other in three dimensions to create an initial very lofty uncompacted material. Air pressure and/or mechanical beating equipment may be utilized to form the lofty layer. The type of fibers in this layer are also an important part of this invention. At least a substantial share of the fibers must be an interspersed fusible plastic material, preferably a thermoplastic with a relatively low melting temperature and/or a low softening temperature to effectuate a positive seal and obtain a very deep, sharply defined embossment pattern. It has been found that very good results are obtained when the layer is composed of a substantial share of a vinyl plastic fiber such as polyvinyl chloride, polyvinyl acetate, polyvinylidene chloride, and copolymers thereof, including various amounts of other resin copolymers as desired, for example, polyethylene. The commercial fiber known as VINYON serves very adequately. The percentage of vinyl plastic in the fiber may range from approximately 10% to 100%, but due to cost considerations is generally maintained below 50%. Instead of vinyl plastics, other thermoplastic materials may be used including thermosetting materials in the thermoplastic state. Illustrative examples of the many possible materials are acrylics such as polymethyl methacrylate, polystyrene and various copolymers of such resins. The remaining share of fibers may be less expensive fibers. For best results, a thermoplastic should be used, usually with a relatively high melting temperature and/or a high softening temperature. Cellulose acetate is the preferred material to use with a vinyl chloride-vinyl acetate copolymer since it apparently is wetted by polymer adhesion and/or cohesion with the vinyl plastic when dielectrically heated to thus flow readily and form a very secure bond to the plastic embossed sheet. Other supplementary fibrous resin materials could also be used if desired, including nylon, such as nylon 6 or nylon 66, polypropylene, etc. Non-fusible materials could also be used as a supplement to the thermoplastic fibers in certain applications, but are less desirable than the thermoplastics. These include such materials as viscose and wool. Of course, the amount of accompanying thermoplastic fiber such as vinyl would have to be increased to obtain a deep embossment and an effective seal if such non-fusible fibers are used.

These fibrous materials must be thoroughly mixed and randomly positioned at various angles with respect to each other in three dimensions to form a lofty uncompacted loosely assembled layer. Against one side of this layer is placed a sheet of woven cloth material, for example cotton. The backing can be formed without the cloth but the resulting product is inferior to the product formed with the cloth sheet. Thereafter, the fibrous layer and woven sheet are needled by a continuous projection of barbed needles through the two materials to intertangle a substantial number of fibers in the fibrous layer with each other and with the woven cloth.

In FIG. 1 is depicted fibrous layer 10 in contact with woven cloth sheet 12. Through these materials needles 14 on a suitable support 16 and possessing a plurality of barbs 18 on the surface thereof repeatedly project as shown by needle 20, thereby intertangling the randomly positioned fibers in layer 10. The needling causes partial compacting as well as intertangling of the fibers. With backing used for embossed plastic sheets for automobile decoration, needling of about 250 times per square inch produces good results. Of course, this will vary by several hundred times per square inch depending upon the original thickness of layer 10, the final thickness desired, the amount of intertangling desired, the size of barbs 18, and whether or not a cloth sheet 12 is used.

After the needling step, a thin coating of a fusible resin material may be applied to at least one side of the joined layer and sheet, i.e. to surface 17 of woven cloth sheet 12 at 50 and/or to the surface fibers exposed on surface 19 of layer 10 on the opposite side of the layer from the woven cloth sheet as at 52. This resin is preferably a thermoplastic material, including thermosetting materials in the thermoplastic state, and may be applied by spraying, powdering, rolling or by any other conventional method. The amount applied may vary with the amount and nature of thermoplastic fibers present since it is basically an optional supplement to the fusible fibers. Thus, the smaller the share of thermoplastic fibers in layer 10, the greater should be the amount of plastic coating to supplement the sealing effect of the fibers to the plastic sheet, to strengthen the backing, and to generate heat for the embossment process. In the preferred form of the invention, the woven cloth sheet and the surface fibers on the opposite side of layer 10 are coated with a thermoplastic coating. The backing is then ready to be joined to a plastic sheet for embossment.

Figure 2:
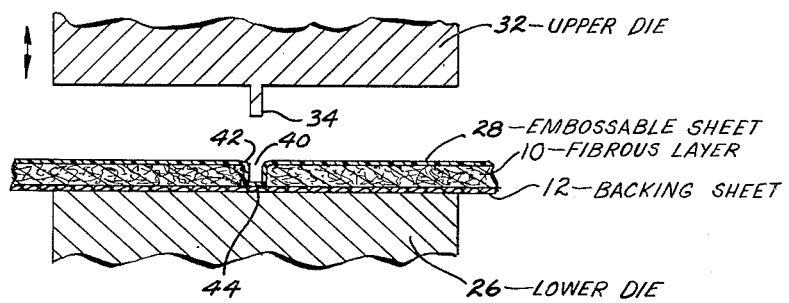
FIG. 2 is a cross sectional view depicting a plastic sheet being embossed and bonded to the backing.
Figure 3:
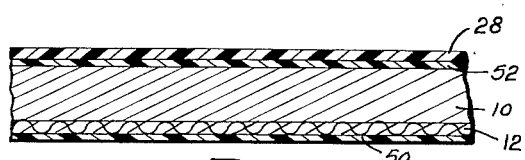
FIG. 3 is a sectional view of a modified form of the invention.
Figure 4:
FIG. 4 is a sectional view of one form of embossable sheet useable with this invention.

Referring to FIG. 2, the joined cloth sheet 12 and partially compacted fibrous layer 10, the latter now considerably thinner than before needling, are placed upon the lower platen 26 of a press to be used for dielectric embossing and sealing. Thereafter, an embossable plastic sheet or woven plastic cloth 28 is placed upon the opposite side of layer 10 from the ordinary woven cloth sheet 12. This plastic sheet may be of any material subject to dielectric embossment and sealing. In other words, it must be capable of being at least partially softened and/or melted by dielectric methods or be so coated that the coating is melted or softened by dielectric methods to be reformed into a new pattern and to be sealed to the fibrous materials. The most widely used plastic and most readily adaptable to such dielectric processes are vinyl plastics such as those mentioned, hereinbefore. This plastic sheet may, of course, possess a cloth lining, or a cloth sheet 54 may be secured between two sheets of plastic 56 as desired.

In place of the preferred vinyl plastic solid sheet or cloth sheet, other polymers and copolymers may be used as the embossable layer under various circumstances, including polyethylene, polypropylene, nylon, polymonochloro trifluoroethylene, cellulose acetate, cellulose butyrate, polytetrafluoroethylene, and polymethylmethacrylate. The possibilities of such variations are practically endless and are well known to those in the art. For convenience such a layer will be termed an embossable sheet or a dielectrically embossable sheet. After positioning this sheet on layer 10 a very high frequency potential is applied across platen 26 and die 32, the latter having a projecting pattern forming surface 34 thereon. Die 32 is then lowered toward platen 26 so that pattern forming surface 34 depresses plastic sheet 28 into the partially compacted but compressible layer 10. The high frequency potential dielectrically softens local portions of sheet 28 under the pattern forming surface 34 to reform the same into an indentation pattern 40, and simultaneously heat seals or bonds plastic sheet 28 to the fusible fibers in layer 10 and the resin coatings.

The resulting decorative laminate possesses a deep and very sharply defined embossed pattern with corners 42 actually approaching right angles. The depth of the pattern is believed to result largely from the combination of the fusible fibers in the backing which locally melt away between the projecting die surface 34 and the cloth layer 12 as compared to the squeezed mat formed in this area with prior art backings, and from the randomly oriented and lofty fibrous material which has been needled to the optimum compactness.

The thermoplastic fibers not only allow pattern depth and afford a firm bond between the plastic sheet and backing layer, but also lend a great deal of inherent binding strength to the intertangled fibrous layer. The sharp angles of the pattern result largely from the partial compactness of the fibrous layer as a result of the needling. The resulting article affords a luxurious padding but at the same time resists compression sufficiently to prevent rounding of corners 42 when projecting die surface 34 is pressed against the assembled layers.

It is recognized that various obvious modifications may be made in the process, in the backing, and in the embossed laminate, disclosed depending upon the application of the laminate. Such modifications are fully intended to be within the protection afforded by law, such protection being limited only by the definitions provided in the appended claims and the reasonable equivalents thereto.

I claim:

1. A decorative laminate comprising a sheet of woven cloth; a layer of fibers on said cloth; said fibers being randomly positioned at various angles with respect to each other in three dimensions and being needled to said cloth so that a substantial number of fibers are intertangled with each other and with said cloth; said layer containing a substantial share of interspersed fusible plastic fibers; and a sheet of dielectrically embossable material in contact with said layer opposite said cloth; said embossable sheet having a sharply defined and deeply impressed indentation embossed pattern thereon and being bonded along said pattern to said fibrous layer by virtue of adhesion and cohesion of said embossable sheet and said fusible fibers.

2. A decorative laminate comprising a sheet of woven cloth; a layer of fibers on said cloth; said fibers being randomly positioned at various angles with respect to each other and being needled to said cloth so that a substantial number of fibers are intertangled with each other and with said cloth; said layer containing a substantial share of interspersed thermoplastic fibers; a thin coating of a fusible plastic on the surface fibers of said layer and on said cloth sheet; and a dielectrically embossable sheet in contact with said layer opposite said cloth; said embossable sheet having a sharply defined and deeply impressed indentation embossed pattern thereon and being heat sealed along said pattern to said fibrous layer by virtue of adhesion and cohesion of said embossable sheet, said thermoplastic fibers, and said coating.

3. A decorative laminate, comprising: a backing sheet; a layer of fibers on said backing sheet; said fibers being substantially all non-oriented and randomly positioned at various angles with respect to each other in three dimensions and being needled to partially compress said layer and so that a substantial number of fibers are intertangled with each other; said fiber layer containing a substantial share of interspersed fusible plastic fibers; and a sheet of embossable material in contact with said fiber layer opposite said backing sheet; said embossable sheet and fiber layer having a sharply defined and deeply impressed indentation embossed pattern therein; said sheet being bonded along the base of said pattern to said fibrous layer by virtue of adhesion and cohesion of said embossable sheet and said fusible fibers; and said backing sheet being bonded to the composite of said layer and sheet along the base of said pattern due to fusion of said fusible fibers.

4. A method of forming a decorative laminate comprising the steps of providing a fibrous material containing at least a substantial share of thermoplastic fibers; randomly positioning said fibers in said material at various angles with respect to each other to form a lofty uncompacted layer; placing a woven cloth sheet on one side of said layer; needling said layer and said cloth to intertangle a substantial number of said fibers to each other and to said cloth and to partially compact said layer; placing an embossable sheet on the opposite side of said layer to said cloth; and dielectrically embossing said sheet, thereby imparting a decorative pattern to said sheet and simultaneously heat sealing said sheet to said fibrous layer by virtue of adhesion and cohesion between said sheet and said thermoplastic fibers.

5. A method of forming a decorative laminate comprising the steps of providing a fibrous material containing at least a substantial share of thermoplastic fibers; randomly positioning said fibers in said material at various angles with respect to each other to form a lofty uncompacted layer; placing a woven cloth sheet on one side of said layer; needling said layer and said cloth to intertangle a substantial number of said fibers to each other and to said cloth and to partially compact said layer; coating the exposed surface of said cloth and the surface fibers of the exposed surface of said layer with a fusible resin material; placing a dielectrically embossable sheet on the opposite side of said layer to said cloth; and dielectrically embossing said sheet with an indentation pattern, thereby imparting a decorative pattern to said sheet and simultaneously heat sealing said sheet to said fibrous layer by virtue of adhesion and cohesion between said sheet, said coatings of resin material, and said thermoplastic fibers.

References Cited in the file of this patent
UNITED STATES PATENTS

| | | |
|---|---|---|
| 2,331,321 | Heaton | Oct. 12, 1943 |
| 2,429,486 | Reinhardt | Oct. 21, 1947 |
| 2,537,126 | Francis | Jan. 9, 1951 |
| 2,621,138 | Messing | Dec. 9, 1952 |
| 2,621,139 | Messing | Dec. 9, 1952 |
| 2,784,132 | Maisel | Mar. 5, 1957 |
| 2,946,713 | Dusina | July 26, 1960 |